Patented June 2, 1936

2,043,132

UNITED STATES PATENT OFFICE 2,043,132

SAUSAGE MAKING PROCESS

Charles H. Vogt, Philadelphia, Pa., assignor to Modern Food Process Company, Philadelphia, Pa., a corporation of Pennsylvania No Drawing. Application April 21, 1934, Serial No. 721,828

4 Claims. (Cl. 99—109)

This invention relates to a method of making casingless sausages having an improved appearance and keeping qualities, when marketed by packing in a carton or the like. More particularly, the invention relates to a method of cooking casingless frankfurters which have been cured without exposing the surfaces of the sausages to water or steam.

In the commercial production of casingless sausages, in accordance with the method described in my Patent #1,964,011, granted June 26, 1934, it was found that the membranes formed about the sausages sometimes exhibited a tendency to become slightly rough as a result of the smoking action. It was found further that when the sausages were marketed in a manner in which the membranes were exposed that the keeping qualities of the product were deleteriously affected when the sausages were cooked in steam or water so that the membranes were exposed to moisture.

The primary purpose of the present invention is to provide a method of making sausages that results in a product having a smooth and dry membrane after the product has been smoked and subjected to the usual cooking action.

Another object of the invention is to provide an improved method of making sausages of the casingless type in which the final treatment of the sausage is carried out when the sausage is snugly fitted within the confining walls of a mold or the like, which serve to smooth or iron out any irregularities, that may have developed in the casing during the smoking of the membrane thereon, at the same time that the sausage is being cooked within the mold.

Another object of the invention is to provide an improved method of making sausages in which the operation of molding the sausage, as well as the final operation on the sausage is carried out in a smooth walled mold, insuring initially that the surface of the molded unit be smooth and that the final product be likewise characterized by a smooth and glossy finish comparable to the smoothness of the wall of the mold in which the initial and final operations are carried out.

Still another object of the invention is to provide an improved process of cooking cured casingless frankfurters by which the frankfurters are maintained under slight pressure and out of direct contact with the heated medium, to the end that the final appearance of the completed product may be enhanced so that the keeping qualities of the product are unaffected by contact thereof with the heating medium.

Still further objects of the invention will appear as a further detailed description thereof proceeds.

The present invention constitutes an improvement upon the process of manufacturing casingless frankfurters disclosed in Patent No. 1,964,011, above referred to. The process of the present invention follows the process disclosed in said application through the smoking step of the process described therein. It was proposed in that application that before putting the sausages on the market, wrapped in "Cellophane" or the like, that the sausages be subjected to a cooking action in an atmosphere of water vapor, while the sausages were kept upon the screens upon which they were disposed during the operations resulting in the formation of a membrane and in the smoking or curing of the product. In carrying out the method of the present invention, the sausages, instead of being cooked by subjecting them to direct contact with the cooking medium, e. g. water vapor in the prior application, the sausages are cooked in such a way as to maintain their surfaces dry and out of direct contact with said medium.

In view of the fact that the procedure that is followed prior to the cooking operation is the same as that disclosed in said prior application, the initial steps of the method of the present invention resulting in an improved product are described only briefly, reference being made to said application for a more complete disclosure of said steps of the process.

In producing casingless frankfurters in accordance with the preferred method of the present invention, a comminuted sausage meat mixture is prepared in accordance with formulae well known in the art. The comminuted meat mixture is stuffed in a multiplicity of individual molds each of which is shaped to the size and form of the desired sausage unit. Rigid-wall molds are preferred, the molds, preferably, taking the form of those disclosed in Patent Number 1,925,157, granted September 5, 1933, comprising as there shown, open-ended tubes mounted in bars so that a multiplicity of the molds can be handled conveniently as a unit. The comminuted meat mixture is stuffed in the individual molds in the manner pointed out in the patent just referred to, and the molds, with the meat mixture therein, are subjected to a very low temperature to freeze or solidify the mixture enabling the molded units to be ejected endwise from the molds without rupture of the even surfaces formed by contact with the smooth walls of the mold.

After the molded units are removed from the mold they are placed upon screens and a membrane formed about the exposed surfaces thereof by subjecting said surfaces to the atmosphere maintained at a temperature of from 90° to 120° F. Preferably the sausages upon the screens are first subjected to a moist atmosphere or a vapor bath maintained at a temperature of 90° to 100° F., and then subjected to dry air maintained at a temperature of about 100° F. to 120° F., as pointed out in greater detail in the prior application above referred to. A membrane forms upon the exposed surfaces of the molded unit during the time that said surfaces are exposed to the atmosphere in the manner just stated.

The sausages are then preferably transferred, while still on the screens, to a smoke-house and subjected to the ordinary smoking action, preferably, beginning at a temperature of approximately 110° to 120° F., and continued until a temperature of 165° F., or even higher is reached. The sausages are smoked to the desired degree and during the smoking action the membranes are toughened. Under certain conditions it was found that the skins lose some of the smoothness that characterize them prior to the smoking operation. If the sausages are to be canned and put on the market in this fashion, the smoked product is then subjected to a canning operation constituting no part of the present invention.

The present invention is particularly concerned with the further treatment of sausages intended to be put upon the market in cartons or wrapped in "Cellophane" or the like.

When it is desired to put the sausages on the market in the manner just stated, it is preferred to subject them to a cooking operation which is carried out in the following manner: After the sausages have been properly smoked they are removed from the screens and again placed in the individual molds in which they are formed, by inserting the sausages into the open-ended tubular molds of Patent Number 1,925,157, above referred to. The sausages will snugly fit the molds and both ends of said molds are then closed as by closure bars and rubber facings, such as illustrated in the patents just referred to. The closure bars and rubber facings serve to provide fluid tight joints between the ends of the molds and the closure bars, and said facings contact with the ends of the sausages disposed therein so that the walls of the mold contact with the normally exposed surfaces of the sausages at substantially all points.

After a group of molds has been filled and closed, it is inserted in a bath of water maintained at a temperature of approximately 170° F., for a period of approximately ten minutes. During this period the surfaces of the sausage that contact with the rigid wall molds are heated, and any roughness in the membranes that cover said surfaces are smoothed or ironed out against the walls of the mold so that the product is provided with a smooth glossy and tender membrane, after it is again removed from the mold following the cooking or heating operation just described. During such operation the frankfurters are maintained in the dry condition that characterizes them when they are removed from the smokehouse.

The dry sausages are then removed from the molds by removing the end closures and ejecting them endwise therefrom. The sausages are then ready to be put upon the market by wrapping them individually in "Cellophane", or by packing them unwrapped in a carton provided to protect the sterile surfaces thereof from contact with the hands of persons handling the product upon the market. Since the sausages are maintained dry the tendency of organisms to produce slime is minimized, since moisture causes such organisms to propagate, and the keeping qualities of the product are thus enhanced by the improved mode of treatment above outlined.

It will be understood that the closures for the open ends of the molds are applied to the groups of molds by clamps such as illustrated in Patent Number 1,925,157. It is found that the treatment of the sausage, after initial removal from the mold, does not appreciably change the size of the molded units, but when they are reinserted it is found that they fit the molds snugly and are under slight compression during the cooking or heating operation that completes their manufacture.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of making sausages which consists in molding a meat mixture into the form of a sausage, exposing the surface of the molded sausage to the atmosphere to form a protective membrane on the molded unit, smoking the sausages, and then reinserting the sausages in the molds, closing said molds to protect the sausages from contact with the cooking medium, and subjecting the sausages in the mold to a cooking temperature while their external surfaces are in contact with the walls of the molds.

2. The method of making sausages which consists in molding a meat mixture into the form of a sausage, removing the molded sausage from the mold and exposing its surface to the atmosphere at a temperature of approximately 120° F. until a protective membrane is formed on the molded unit, smoking the sausage, reinserting it in the mold in which it was formed, closing said mold so that said sausage is protected from contact with the cooking medium, and then subjecting the mold and the sausage therein to a cooking temperature.

3. The method of making sausages which consists in molding a meat mixture into the form of a sausage, removing the molded sausage from the mold and exposing its surface to the atmosphere at a temperature of approximately 120° F. until a protective membrane is formed on the molded unit, smoking the sausage, reinserting it in the mold in which it was formed, closing the mold to protect the sausage from contact with the cooking medium, and then inserting the mold and sausage in water heated to a cooking temperature to cook the sausage without contact of the water with the membrane.

4. The method of making sausages which consists in molding a comminuted meat mixture in the form of a sausage, removing the sausage from the mold and exposing its molded surfaces to atmosphere and to smoke to form a membrane and toughen the latter, then again inserting the sausage in the mold, closing the mold and cooking and simultaneously smoothing the surface of the sausage in said mold.

CHARLES H. VOGT.